US008149752B2

(12) United States Patent
Li et al.

(10) Patent No.: US 8,149,752 B2
(45) Date of Patent: Apr. 3, 2012

(54) MEDIA-ACCESS-CONTROL PROTOCOL FOR A NETWORK EMPLOYING MULTI-USER WIRELESS CHANNELS

(75) Inventors: Li Li, Edison, NJ (US); Harish Viswanathan, Morristown, NJ (US); Ramachandran Ramjee, Bangalore (IN)

(73) Assignee: Alcatel Lucent, Paris (FR)

( * ) Notice: Subject to any disclaimer, the term of this patent is extended or adjusted under 35 U.S.C. 154(b) by 895 days.

(21) Appl. No.: 12/124,258

(22) Filed: May 21, 2008

(65) Prior Publication Data

US 2009/0010216 A1 Jan. 8, 2009

Related U.S. Application Data

(60) Provisional application No. 60/958,622, filed on Jul. 6, 2007.

(51) Int. Cl.
*H04H 20/71* (2008.01)
*G01R 31/08* (2006.01)
*H04B 3/36* (2006.01)

(52) U.S. Cl. ............. 370/312; 370/230; 370/235; 455/7

(58) Field of Classification Search .......... 370/230–235, 370/312; 455/7
See application file for complete search history.

(56) References Cited

U.S. PATENT DOCUMENTS

| 7,738,905 | B2 * | 6/2010 | Bachl et al. .................. 455/522 |
| 2001/0036810 | A1 | 11/2001 | Larsen |
| 2002/0197969 | A1 | 12/2002 | Moon et al. |
| 2004/0205105 | A1 | 10/2004 | Larsson et al. |
| 2005/0064863 | A1 | 3/2005 | Shibouta |

(Continued)

FOREIGN PATENT DOCUMENTS

EP 1 610 486 A2 6/2005

(Continued)

OTHER PUBLICATIONS

"Enhanced Transmission Mode Selection in IEEE 802.11a WLAN System," by in K.-Y. Doo, J. Young Song, and D.-H. Cho, Proceedings of Vehicular Technology Conference, Los Angeles, Sep. 2004, pp. 5059-5062.

(Continued)

*Primary Examiner* — Ricky Ngo
*Assistant Examiner* — Paul Masur
(74) *Attorney, Agent, or Firm* — Mendelsohn, Drucker & Associates, P.C.; Yuri Gruzdkov; Steve Mendelsohn

(57) ABSTRACT

A medium-access-control (MAC) scheduler, according to one embodiment of which a station of a wireless network evaluates data throughputs corresponding to three different transmission configurations for transmission of a packet over a first of that station's wireless links. The first and second of those transmission configurations have the packet encoded in the first and second tiers, respectively, of a two-tier signal. The third transmission configuration has the packet encoded as a conventional single-tier signal. For each of the first and second transmission configurations, the station selects a second of that station's wireless links for transmission of at least a second packet, with the first and second packets encoded in different respective tiers of the two-tier signal. The station varies power allocation between the first and second tiers to optimize data throughput for each of the first and second transmission configurations and selects from the first, second, and third transmission configurations one resulting in the highest data throughput.

22 Claims, 8 Drawing Sheets

U.S. PATENT DOCUMENTS

| | | | |
|---|---|---|---|
| 2006/0171347 A1 | 8/2006 | Attar et al. | |
| 2007/0133469 A1 | 6/2007 | Shin et al. | |
| 2007/0155395 A1 | 7/2007 | Gopalakrishnan et al. | |
| 2007/0223374 A1* | 9/2007 | Popovski et al. | 370/230 |
| 2007/0286238 A1* | 12/2007 | Wang et al. | 370/478 |
| 2008/0025323 A1* | 1/2008 | Khan | 370/400 |
| 2008/0056173 A1 | 3/2008 | Watanabe | |
| 2009/0073916 A1 | 3/2009 | Zhang et al. | |

FOREIGN PATENT DOCUMENTS

| WO | WO 2006/052758 A2 | 5/2006 |
|---|---|---|

OTHER PUBLICATIONS

"Joint Channel Assignment and Routing for Throughput Optimization in Multi-radio Wireless Mesh Networks," by Mansoor Alicherry et al., Proceedings of the 11$^{th}$ Annual International Conference on Mobile Computing and Networking, MobiCom 2005, Aug. 28-Sep. 2, 2005, Cologne, Germany, pp. 58-72.

"Maximum Throughput for the Additive Gaussian Noise Channel with a Pre-Determined Rate Set and Unknown Interference," by Suman Das et al, Proceedings of the Annual Conference on Information Sciences and Systems, Mar. 19, 2004, XP002363835, 6 pages.

"Optimal Rate Allocation for Superposition Coding in Quasi-Static Fading Channels," by Youjian Liu et al, Proceedings 2002 IEEE International Symposium on Information Theory, ISIT 02, Lausanne, Switzerland, Jun. 30-Jul. 5, 2002, XP010601823, p. 111.

Y. Liang and V. Veeravalli, "Gaussian Orthogonal Relay Channels," IEEE Transactions on Information Theory, 2005, vol. 51, No. 9, pp. 3284-3289.

* cited by examiner

100

300

DATA

ACK

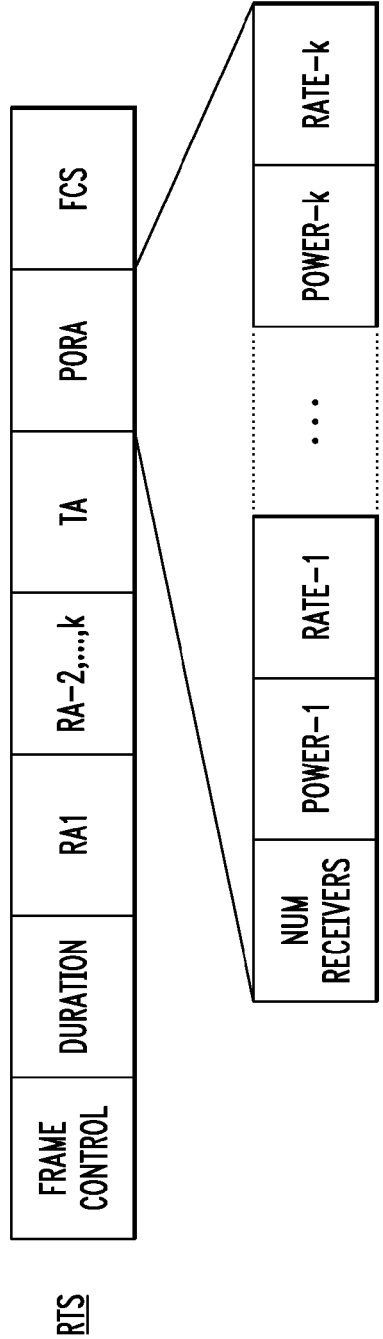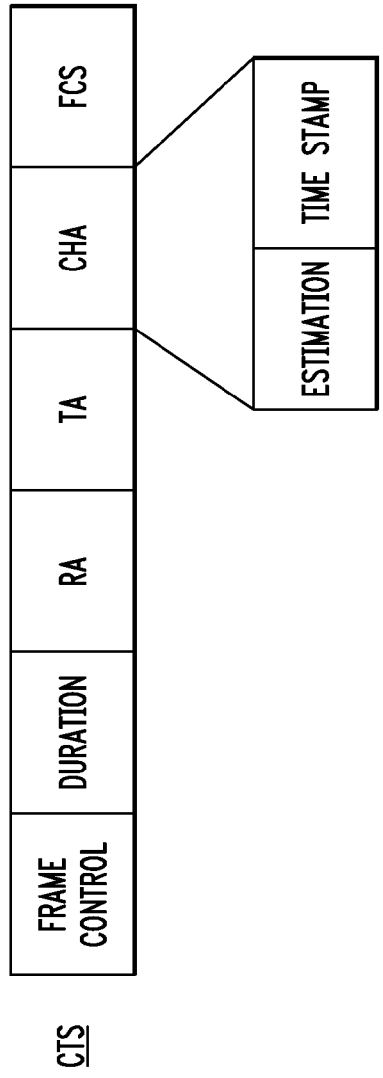

700

800

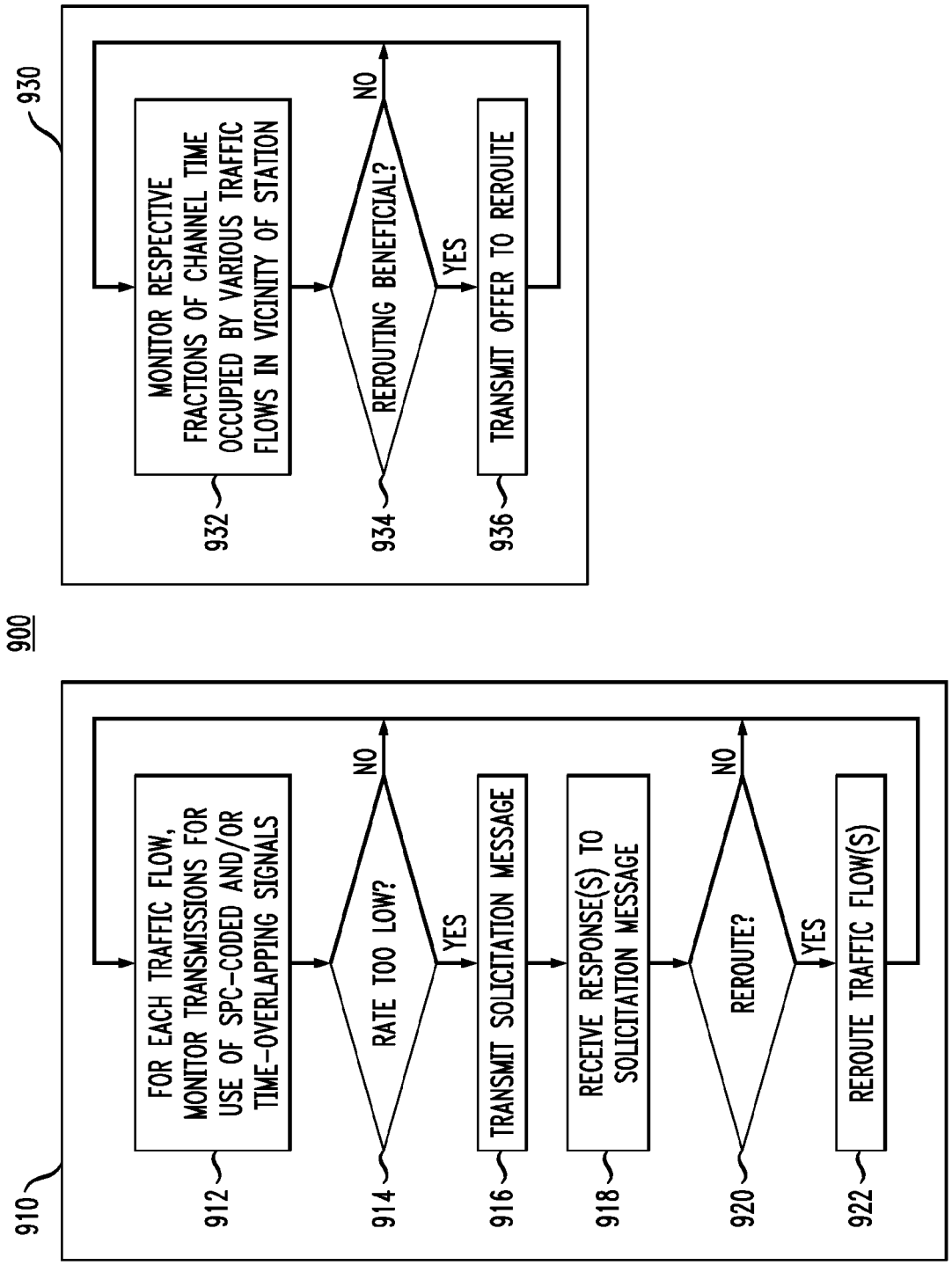

MEDIA-ACCESS-CONTROL PROTOCOL FOR A NETWORK EMPLOYING MULTI-USER WIRELESS CHANNELS

CROSS-REFERENCE TO RELATED APPLICATIONS

This application claims priority from U.S. Provisional Patent Application No. 60/958,622 filed Jul. 6, 2007, and entitled "Superposition Coding for Wireless Mesh Networks," which is incorporated herein by reference in its entirety. The subject matter of this application is related to that of U.S. Patent Application Publication No. 2009/0010234, which is also incorporated herein by reference in its entirety.

BACKGROUND OF THE INVENTION

1. Field of the Invention

The present invention relates to wireless networks and, more specifically, to communication protocols for time-overlapping independent unicast transmissions from a single transmitter to multiple receivers and/or from multiple transmitters to a single receiver.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A traditional wireless network typically treats the wireless channel as a point-to-point link for unicast transmissions, i.e., transmissions in which a communication packet is sent from a single transmitter to a single specified receiver. This treatment can be disadvantageous in that it tends to undervalue or dismiss altogether the benefits of multi-user wireless channels. The latter enable time-overlapping unicast transmissions from a single transmitter to multiple receivers and/or from multiple transmitters to a single receiver. The use of multi-user wireless channels can advantageously increase the transmission capacity of the network without significantly increasing the hardware cost. However, various communication protocols that can be used to realize the benefits of multi-user wireless channels are not sufficiently developed yet.

SUMMARY OF THE INVENTION

Problems in the prior art are addressed by a medium-access-control (MAC) scheduler, according to one embodiment of which a station of a wireless network evaluates data throughputs corresponding to three different transmission configurations for transmission of a first packet over a first of that station's wireless links. The first transmission configuration has the first packet encoded in the first tier of a two-tier signal. The second transmission configuration has the first packet encoded in the second tier of a two-tier signal. The third transmission configuration has the first packet encoded as a conventional single-tier signal. For each of the first and second transmission configurations, the station selects a second of that station's wireless links for transmission of at least a second packet, with the first and second packets encoded in different respective tiers of the two-tier signal. The station varies power allocation between the first and second tiers to optimize data throughput for each of the first and second transmission configurations and selects from the first, second, and third transmission configurations one resulting in the highest data throughput. The selected transmission configuration may have the station as a transmitter, in which case superposition coding may be employed by the station for generating the two-tier signal. Alternatively, the selected transmission configuration may have the station as a receiver, in which case successive-interference-cancellation processing may be employed by the station for decoding the received two-tier signal.

According to one embodiment, at a first station of a wireless network, a communication method comprises the steps of: (A) comparing data throughputs corresponding to at least two different transmission configurations for transmission of a first communication signal over a first wireless link having the first station as a terminal, at least one of these transmission configurations corresponding to transmission having the first communication signal as a tier of a multi-tier signal and another one of these transmission configurations corresponding to transmission of the first communication signal as a single-tier signal; and (B) selecting a transmission configuration for the transmission of the first communication signal based on the comparison.

According to another embodiment, a wireless network comprises a plurality of stations coupled via one or more corresponding wireless links, with at least one station of that plurality of stations being adapted to: (A) compare data throughputs corresponding to at least two different transmission configurations for transmission of a first communication signal over a first wireless link having the station as a terminal, at least one of said transmission configurations corresponding to transmission having the first communication signal as a tier of a multi-tier signal and another one of said transmission configurations corresponding to single-tier transmission of the first communication signal; and (B) select a transmission configuration for the transmission of the first communication signal based on said comparison.

BRIEF DESCRIPTION OF THE DRAWINGS

Other aspects, features, and benefits of the present invention will become more fully apparent from the following detailed description, the appended claims, and the accompanying drawings in which:

FIGS. 5A-B show representative formats of RTS (request to send) and CTS (clear to send) packets that can be used in the MAC layer of the network of FIG. 1 according to one embodiment of the invention;

FIG. 9 shows a flowchart of a routing protocol that can be used at a station of the network of FIG. 1 according to one embodiment of the invention.

DETAILED DESCRIPTION

Figure 1:
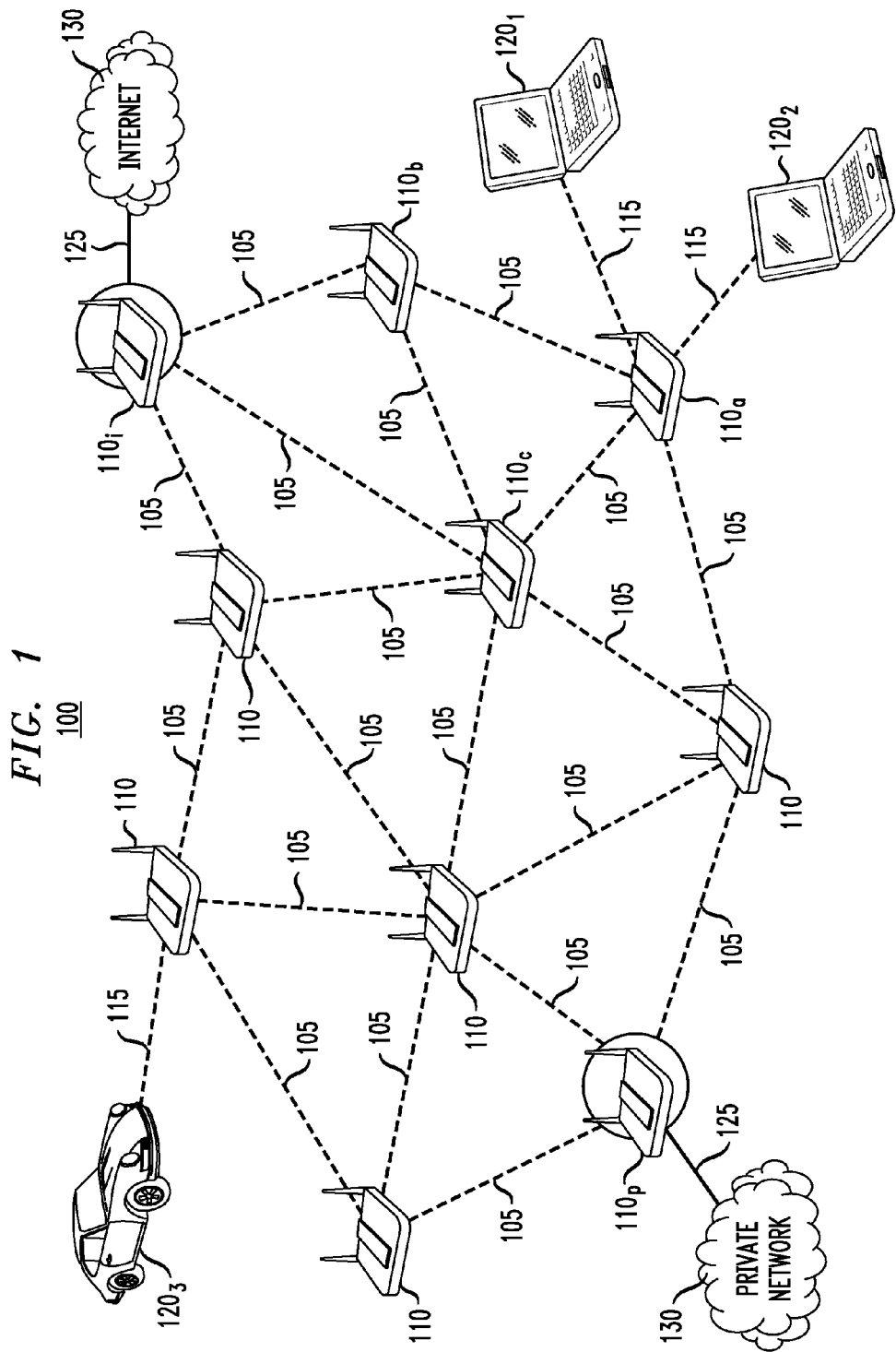
FIG. 1 shows a representative wireless network, in which various embodiments of the invention can be practiced.

FIG. 1 shows a representative wireless network 100, in which various embodiments of the invention can be practiced. Network 100 is a mesh network having a plurality of mesh nodes 110. Each node 110 is adapted to perform several functions. For example, the node can serve as an access point (AP) for one or more mobile terminals (MTs), such as MTs $120_1$-$120_3$, present in the area. Each MT 120 can gain access to network 100 by establishing a wireless communication link 115 with a corresponding (usually providing the strongest reception) one of nodes 110. The node can further serve as a backhaul router that enables network 100 to relay communication signals, via wireless links 105, from node to node. Some of nodes 110, e.g., node $110_i$ and node $110_p$, can further serve as gateways that connect network 100, via respective wireline or wireless links 125, to an external wireline network 130, e.g., the Internet or a private wireline network. The mesh topology of network 100 provides propagation-path diversity for substantially any communicating pair of nodes 110, meaning that there exist at least two different signal-propagation routes between those nodes.

If configured in accordance with an embodiment of the invention, network 100 is capable of supporting multi-user wireless channels. For example, in one embodiment, the physical (PHY) layer of network 100 enables multi-user wireless channels through superposition coding (SPC) and successive interference cancellation (SIC). The media-access-control (MAC) layer of network 100 leverages these PHY-layer capabilities by identifying suitable transmission opportunities in a dynamic setting and arbitrating access to the wireless medium for various stations of the network (e.g., nodes 110 and MTs 120). The routing layer of network 100 enhances the utility of multi-user wireless channels by identifying signal-propagation routes that increase (e.g., maximize) the number of transmission opportunities with the use of multi-user wireless channels and directing the traffic flows through those routes. Each of the PHY, MAC, and routing layers is described in more detail below.

Physical Layer

This subsection provides, inter alia, a brief overview of superposition coding (SPC) and successive interference cancellation (SIC). This overview is intended to aid the understanding of certain features of the MAC and routing protocols that are described in the subsequent subsections. Additional details on SPC coding and SIC processing can be found, e.g., in Chapter 6 of "Fundamentals of Wireless Communication" by D. Tse and P. Viswanath, Cambridge University Press, 2005, which book is incorporated herein by reference in its entirety.

SPC coding is a technique that can be used by a transmitter for simultaneous transmission of independent messages to two or more receivers. For simplicity, we restrict ourselves herein to a two-receiver case. The transmitter can be, e.g., node $110_a$, and the two receivers can be, e.g., (i) MTs $120_1$ and $120_2$ or (ii) node $110_b$ and MT $120_1$ or (iii) nodes $110_b$ and $110_c$. Other transmitter/receiver combinations are also possible. SPC coding exploits the usually-present differences in the amounts of signal attenuation in the communication links corresponding to the two receivers. The power of the transmitter is partitioned between the two respective signals so that the signal subjected to lower attenuation is allocated less power than the signal subjected to greater attenuation. The transmitter selects the transmission rate for each of the signals, encodes and modulates each of the messages separately at the selected rate, and superimposes the resulting respective signals for transmission to the two receivers.

Figure 2:
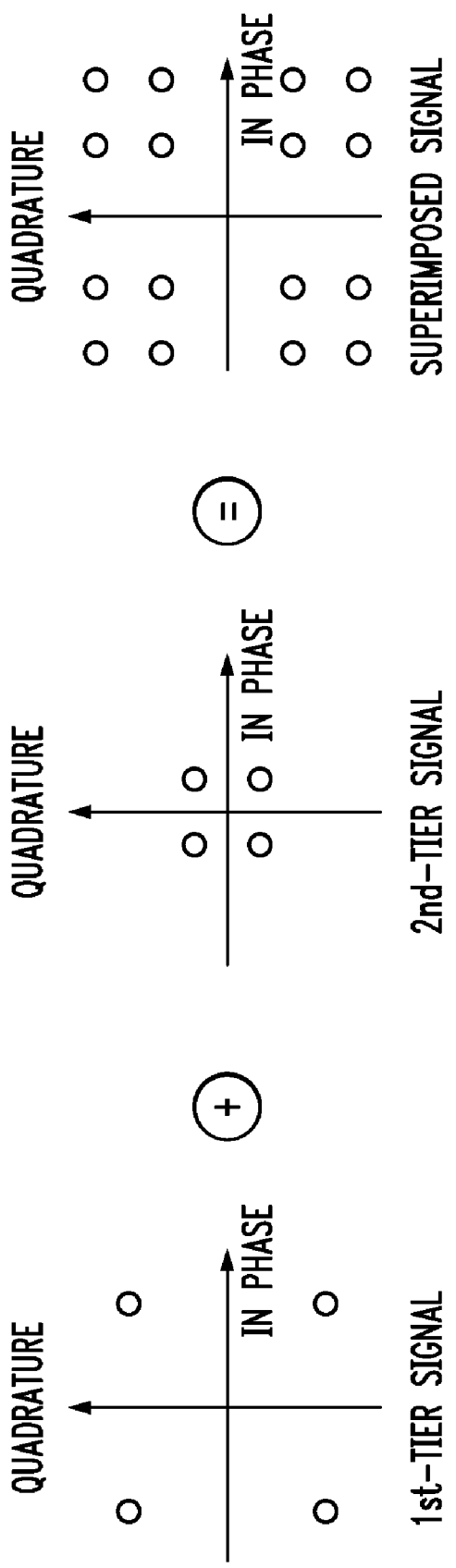
FIGS. 2A-C graphically show representative communication signals that can be used to implement superposition coding (SPC) in the network of FIG. 1 according to one embodiment of the invention.

FIGS. 2A-C graphically show representative communication signals that can be used to implement SPC coding in network 100 according to one embodiment of the invention. More specifically, FIGS. 2A-C graphically show a signal intended for a first receiver (a first-tier signal), a signal intended for a second receiver (a second-tier signal), and a corresponding superimposed signal, respectively. Both of the first- and second-tier signals are generated using quadrature phase shift keying (QPSK) modulation, and FIGS. 2A-B depict those signals in the respective complex planes. The larger amplitude of the first-tier signal relative to that of the second-tier signal is indicated by the greater separation between the QPSK constellation points in FIG. 2A than in FIG. 2B. A superposition of the two signals results in a new constellation having sixteen constellation points (see FIG. 2C). Those sixteen constellation points are composed of four quartets, each having a corresponding QPSK constellation point of the first-tier signal that is split four ways due to the presence of the second-tier signal. One skilled in the art will appreciate that the technique illustrated by FIGS. 2A-C can be further extended to three or more tiers of signals.

In one configuration, the two intended receivers may decode the received signal using different signal-processing schemes. More specifically, the intended receiver of the first-tier signal decodes the first-tier signal treating the superimposed second-tier signal as noise or interference. The intended receiver of the second-tier signal decodes the latter using SIC processing, during which the receiver first decodes the first-tier signal, re-encodes it, subtracts the resulting signal from the original superimposed signal, and then decodes the remaining signal. For example, during receiver training, locations on the complex plane of the constellation points for the first-tier signal are determined by clustering together the points of each corresponding quartet. Slicing thresholds are then set based on the determined locations. During regular operation, the slicing thresholds are used to make slicing decisions and recover the data carried by the first-tier signals. Based on the recovered data, an estimated contribution of the first-tier signal into the superimposed signal is calculated. The estimated contribution is then subtracted from the superimposed signal to obtain an estimated second-tier signal. Finally, the latter is processed in a conventional manner to recover the encoded data.

Although the intended receiver of the first-tier signal normally treats the second-tier signal as noise or interference, in some cases, that receiver might know the contents of the second-tier message a priori. Such knowledge is hereafter referred to as "side information." With the side information, the receiver can subtract the second-tier signal before the decoding processing. The use of side information is beneficial because it improves the effective signal-to-noise ratio (SNR) for the first-tier signal, which enables the corresponding transmitter to use a different, more advantageous power allocation between the first- and second-tier signals and/or a higher data rate for the first-tier signal.

In an alternative configuration, a receiver can decode the superimposed signal (see FIG. 2C) and recover the data carried by the constituent first- and/or second-tier signals (FIGS. 2A-B) using a detection method hereafter referred to as "joint detection." Joint detection detects the superimposed signal (FIG. 2C) as if it were generated using 16-ary quadrature amplitude modulation (16-QAM). In each time slot, the superimposed signal is appropriately sliced to determine which 16-QAM symbol it corresponds to. The data carried by the constituent first- and second-tier signals are then inferred from that 16-QAM symbol. The receiver can discard the data corresponding to the unwanted constituent signal and retain the data corresponding to the wanted one.

Figure 3:
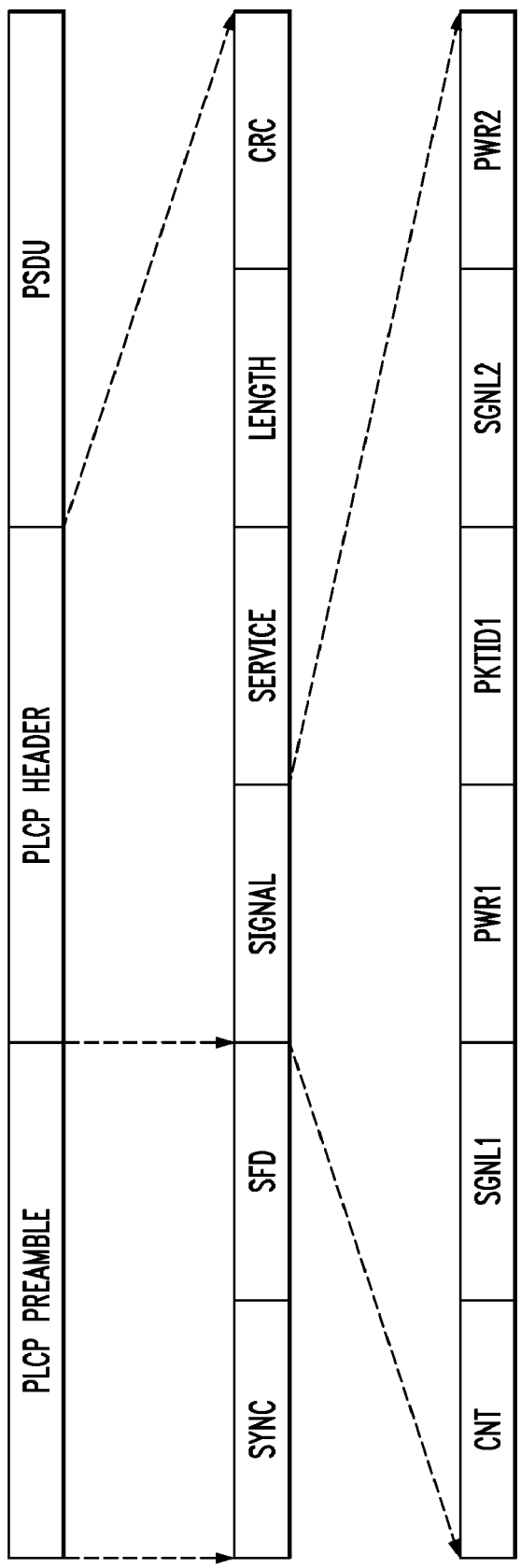
FIG. 3 shows a physical-layer frame that can be used in the network of FIG. 1 according to one embodiment of the invention.

FIG. 3 shows a PHY-layer frame (packet) 300 that can be used in network 100 according to one embodiment of the invention. The format of frame 300 is generally analogous to that of the interoperable PLCP (physical layer convergence protocol) protocol data unit (or PPDU) of IEEE Standard 802.11, which is incorporated herein by reference in its entirety. However, certain fields of frame 300 differ from the corresponding fields of the PPDU.

Frame 300 contains a PLCP preamble, a PLCP header, and a PLCP service data unit (PSDU). The PLCP preamble contains the following fields: synchronization (SYNC) and start frame delimiter (SFD). The PLCP header contains the following fields: signaling (SIGNAL), service (SERVICE), length (LENGTH), and cyclic redundancy code (CRC). Each of these fields is described in detail in IEEE Standard 802.11b. The format of the PSDU is similar to that described in legacy IEEE Standard 802.11.

Frame 300 can be used to enable SPC coding and SIC processing for example as follows. The SFD field is used as a pilot signal for estimation of the SNR and signal attenuation in the link. This channel-estimation information is derived at the receiver and then fed back to the transmitter, e.g., using a MAC-layer packet (see the next subsection). Channel-estimation information is preferably derived from a transmission that originated from a single receiver, for example, because, for time-overlapping transmissions originating from multiple transmitters, the untangling of the composite SNR into individual SNR components corresponding to individual communication links might be relatively computationally intense.

The SIGNAL field of frame 300 differs from that of a conventional 802.11 PLCP header in that it has a variable length that can accommodate additional parameters, such as the rate and power for multiple tiers of signals. For example, subfield CNT indicates the number of tiers in the packet (e.g., CNT=2 for a two-tier signal). Subfields SGNL1 and SGNL2 indicate the rates for the first- and second-tier signals, respectively. Similarly, subfields PWR1 and PWR2 indicate the power allocated to the first- and second-tier signals, respectively. The SIGNAL field may also have optional subfield PKTID1 that identifies the corresponding first-tier packet and enables the receiver to take advantage of the corresponding side information (if available). A similar optional subfield (not explicitly shown) can be added for second-tier signals. Additional subfields analogous to subfields SGNL1, PWR1, and PKTID1 can be added for any further tiers of signals. In a preferred configuration, the PLCP preamble and PLCP header are not SPC coded and are transmitted using the base rate and full transmit power.

In one embodiment, the PSDU is generated using an error-correction code. The code enables the receiver to accurately reconstruct the first-tier signal despite the presence of transmission errors, thereby also improving the accuracy with which the second-tier signal is reconstructed after the subtraction of the first-tier signal. For example, Reed-Solomon encoding is capable of providing such error-correction functionality. The use of packet scrambling described in IEEE Standard 802.11b may optionally be implemented to further reduce the packet error rate (PER).

A station of network 100 (e.g., node 110 or MT 120) is configured to store in an SNR table the estimated SNR for each of its links. For each link, the SNR table preferably contains (1) the most recent SNR and (2) an averaged SNR, with the averaging interval being, e.g., several seconds in duration. The SNR table may be periodically refreshed using the timestamps of the corresponding entries. For example, entries older than the channel-coherence time may be deleted. The channel-coherence time depends on the network environment and can be on the order of several hundred milliseconds to several seconds. Each entry in the SNR table has a flag indicating whether the stored value has been fed back to the corresponding transmitter. The SNR table is maintained and shared by the PHY, MAC, and routing layers.

For transmission over a link that does not have a corresponding entry in the SNR table, a transmitter in network 100 (e.g., node 110 or MT 120) is configured to revert back to a conventional transmit mode, e.g., base rate, full transmit power, and no SPC coding. For transmissions over the links that have corresponding entries in the SNR table, the transmitter is configured to use SPC coding for example as follows. The transmitter retrieves the relevant entries from the SNR table and uses them to determine the rate and power allocation for each tier of signals. The transmitter then generates the respective signal for each tier using the respective rate and scales each signal based on the determined power allocation. The individual signals so generated are summed to generate the corresponding superimposed PSDU (see FIG. 3). The transmitter then prepends to the PSDU the corresponding PLCP preamble and PLCP header to generate frame 300. Finally, frame 300 is transmitted to the intended receivers.

At an intended receiver (e.g., node 110 or MT 120), frame 300 is processed, for example, as follows. By processing the PLCP header of frame 300 and parsing its SIGNAL field, the receiver identifies the frame as containing an SPC-coded signal. The receiver then applies the above-described SIC processing to recursively demodulate and decode the different tiers of signals in the PSDU. The receiver may use side information (if available) in that SIC processing. The relevant side-information packet(s) can be retrieved from a packet cache, e.g., using the corresponding packet ID(s) from the SIGNAL field as key(s).

SIC processing can also be used in a situation where several transmitters are triggered by the receiver to generate at the receiver time-overlapping transmissions. The transmitters perform a conventional (not SPC-coded) transmission, with the link asymmetry (i.e., appropriately differing signal attenuations in the respective links) doing the job of creating decodable tiers of signals at the receiver. The receiver may first store the received superimposed signal in a buffer. It then processes the stored signal to extract, demodulate, and decode a constituent signal that has the highest relative power using the processing analogous to that used for the first-tier signal of an SPC-coded signal. Note that, in the multiple-transmitter case, different tiers of signals might not be perfectly temporally aligned. Therefore, before the subtraction operation, the receiver appropriately aligns the reconstructed first-tier signal with the original stored in the buffer and only then performs the subtraction. After the subtraction, the receiver finds the PLCP preamble of the second-tier signal, and then processes the corresponding PLCP header and PSDU. This procedure is repeated recursively until all tiers of signals are processed.

In summary, the PHY layer enables multi-user wireless channels through the use of multi-tier communication signals. A multi-tier signal represents a superposition of two or more independent, decodable constituent signals that are referred to as tiers of that multi-tier signal. A multi-tier signal may generally have M tiers, where M is any integer greater than one. The tiers are usually numbered in the order of decreasing signal intensity, with the first-tier signal having the highest intensity, the second-tier signal having the second-highest intensity, etc. A multi-tier signal can be generated in at least two different ways: (1) by a transmitter generating an outgoing signal while using SPC coding and (2) by link asymmetry in the wireless medium, which causes two or more conventional single-tier signals generated by respective two or more transmitters to overlap at the receiver in a manner that creates decodable (e.g., with SIC processing) tiers of signals. The term "single-tier signal" refers herein to a conventional communication signal having a single constituent signal that is intended for a specified point-to-point unicast transmission.

Medium-Access-Control Layer

The MAC layer for network 100 is designed to (1) enable feedback of channel-estimation information, e.g., SNR values from a station's SNR table, to the respective neighbor stations, (2) enable the use of multi-tier signals, e.g., through time-overlapping independent transmissions from multiple transmitters to a single receiver and SPC-coded transmissions from a single transmitter to multiple receivers, and (3) maintain long-term fairness to other competing stations in the network. The corresponding MAC protocol can generally be treated as an extension of the MAC protocol specified in IEEE Standard 802.11. The 802.11 MAC protocol is modified as described below to achieve these design goals.

Figure 4A:
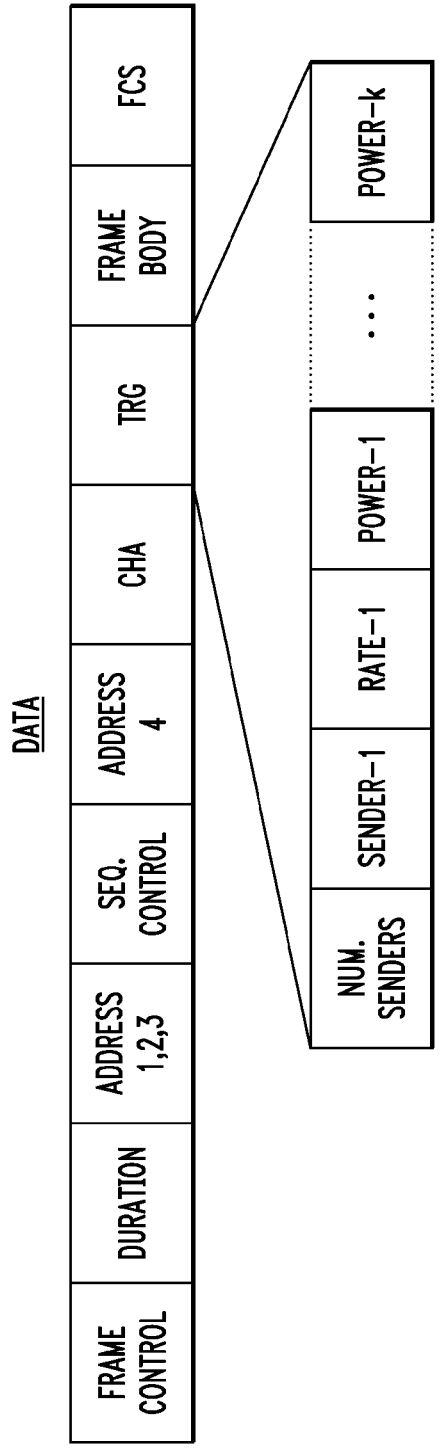
FIGS. 4A-B show representative formats of DATA (data) and ACK (acknowledgement) packets that can be used in the MAC (medium-access-control) layer of the network of FIG. 1 according to one embodiment of the invention.
Figure 4B:
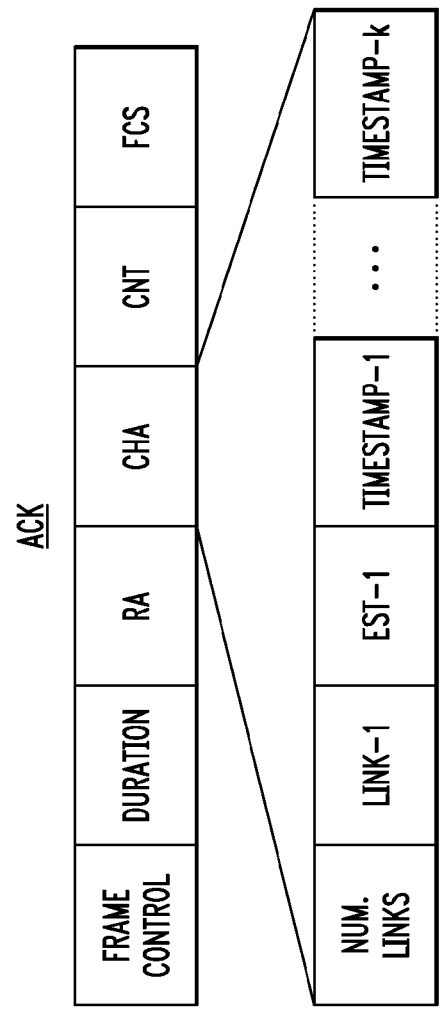

FIGS. 4A-B show representative formats of DATA (data) and ACK (acknowledgement) packets that can be used in the MAC layer of network 100 according to one embodiment of the invention. DATA packet (FIG. 4A) contains the following fields: Frame Control, Duration, Address 1, Address 2, Address 3, Sequence Control, Address 4, CHA (channel estimation), TRG (trigger), Frame Body, and FCS (frame check sequence). ACK packet (FIG. 4B) contains the following fields: Frame Control, Duration, RA (receiver address), CHA, CNT (pending packet count), and FCS (frame check sequence). All fields other than the CHA, TRG, and CNT fields are generally analogous to the corresponding fields described in IEEE Standard 802.11. The type and subtype of Frame Control of the ACK or DATA frame might indicate whether a new format, e.g. type 01 and subtype 0101, or an old format, e.g., type 01 and subtype 1101, is being used. The CHA, TRG, and CNT fields of the new format are described in more detail below.

Field CHA contains channel estimation information. As indicated above, channel-estimation information is derived in the PHY layer using the SFD of a PHY-layer packet that is received by a station of network 100 while not being temporally superimposed with one or more additional packets from one or more respective additional transmitters. The received PHY-layer packet may correspond to a DATA or ACK packet of the MAC layer. The station may feed the derived channel-estimation information back to the originator of the received packet using the CHA field of a next ACK or DATA packet intended for that originator. A packet intended for multiple receivers may contain channel-estimation information corresponding to multiple respective links.

Field CHA has the following subfields. Subfield Num. Links indicates for how many links the channel estimation information is being fed back. Subfield Link-1 provides the ID of the first link. Subfield EST-1 provides that link's estimated SNR. Subfield Timestamp-1 has the timestamp that indicates when channel estimation was obtained. Field CHA might contain additional subfields Link-k, EST-k, Timestamp-k for any additional link (illustratively the k-th link).

Field CNT of an ACK packet is used to indicate whether the station has any pending packets for the intended receiver (RA) of that ACK packet. Each station is configured to maintain a pending-traffic table that has a pending-packet count (i.e., the number of packets that are pending at a corresponding neighbor station for transmission to this station). Each such entry is refreshed from time to time based on the information contained in the respective fields of the received ACK packets, or cleared by a time out (e.g., when the age of the entry exceeds a certain specified age). The pending-packet count is reduced by one with each DATA packet received from the corresponding neighbor station.

Field TRG can be used to enable time-overlapping transmissions of packets from multiple respective transmitters to a single receiver. Field TRG has the following subfields. Subfield Num. Senders indicates the number of senders to be triggered. Subfield Sender-1 provides the ID of the first sender. Subfield Rate-1 indicates the rate for the first sender. Subfield Power-1 indicates the power for the first sender. Field TRG might contain one or more additional subfields Sender-k, Rate-k, and Power-k for any additional senders (illustratively k).

In one configuration, field TRG can be used, for example, as follows. For clarity of presentation and without loss of generality, we provide a two-transmitter example. One skilled in the art will appreciate that time-overlapping transmissions from three or more transmitters to a single receiver can similarly be implemented. The three stations for the two-transmitter example are referred to as stations A, B, and C, with stations B and C corresponding to the first- and second-tier signals, respectively, of the corresponding multi-tier signal.

Before scheduling a DATA packet for transmission, station A consults its pending-traffic and SNR tables to determine whether there are neighbor stations that can benefit from time-overlapping transmissions to station A. If the pending-traffic table indicates such a situation, then station A inserts a corresponding trigger field into its DATA packet. In this example, the trigger field will list stations B and C and their suggested transmit powers and rates, the latter derived based on the SNR table. The trigger field indicates to stations B and C that they may proceed with their respective transmissions to station A, each using the respective suggested rate and power. After a SIFS (short interframe space) interval, each of stations B and C transmits an ACK packet and one or more DATA packets. Note that these transmissions are generally not synchronized because station A can apply packet realignment and SIC processing to decode the received packets. If there are no DATA packets to transmit from stations B and C to station A, then the rate and power indicated in the trigger field can still be used to send time-overlapping ACK packets from stations B and C. Each of stations A, B, and C is configured to store the recently sent packets in a sent-packet cache for possible use as side information in the future. If the trigger field is not present, then stations B and C do not time-overlap their ACK transmissions, but instead separate them by an additional SIFS interval, with station B transmitting its ACK packet first after the first SIFS interval and station C transmitting its ACK packet second after the additional SIFS interval.

FIGS. 5A-B show representative formats of RTS (request-to-send) and CTS (clear-to-send) packets that can be used in the MAC layer of network 100 according to one embodiment of the invention. Although the above-described DATA and ACK packets fully enable the feedback of channel-estimation information to the putative transmitter, the RTS/CTS packets can be used as additional opportunities for providing such feedback. These opportunities can help to make the channel-estimation information more recent and therefore more accurate.

RTS packet 510 (see FIG. 5A) contains the following fields: Frame Control, Duration, RA1 (receiver address 1), RA2 (receiver address 2), etc., TA (transmitter address), PORA (power and rate allocation), and FCS (frame check sequence). Each of Frame Control, Duration, TA, and FCS fields is described in detail in IEEE Standard 802.11b. Each of RA1 and RA2 fields is generally analogous to the RA field of the RTS frame of IEEE Standard 802.11. RA1 denotes the address of the receiver of the first-tier signal. RA2 denotes the address of the receiver of the second-tier signal. One or more extra RA fields can be added to denote receivers of any additional-tier signals.

Field PORA has the following subfields. Subfield Num. Receivers indicates the number of receivers with which station TA intends to communicate. Subfield Power-1 indicates power allocated to receiver RA1. Subfield Rate-1 indicates the rate allocated to receiver RA1. Field PORA might contain one or more additional subfields Power-k, Rate-k for any additional receivers (illustratively k).

If the station transmitting an RTS packet has valid channel-estimation information for the stations indicated in fields RA1 and RA2, then field PORA of the RTS packet indicate the rate and power allocation for the transmission of two respective CTS packets 520 (see FIG. 5B) from those stations, which are both transmitted after a single SIFS interval and, as such, overlap in time and produce a corresponding multi-tier signal at the intended receiver, i.e., the TA station. The intended receiver will apply the above-described packet realignment and SIC processing to decode these time-overlapped CTS packets 520. If no channel-estimation information is available for at least one of the RA1 and RA2 stations, then those stations do not time-overlap their CTS transmissions, but instead separate them by an additional SIFS interval, with the RA1 station transmitting its CTS packet 520 first after the first SIFS interval and the RA2 station transmitting its CTS packet 520 second after the additional SIFS interval.

CTS packet 520 (FIG. 5B) contains the following fields: Frame Control, Duration, RA (receiver address), CHA (channel estimation), and FCS. Each of Frame Control, Duration, RA, and FCS fields is described in detail in IEEE Standard 802.11. The RA field of CTS packet 520 is a copy of the TA field from the immediately preceding RTS packet 510 to which this CTS packet is a response. Subfield Estimation in field CHA of CTS packet 520 indicates the estimated SNR for the corresponding link, which SNR has been calculated using the SFD of the PHY-layer packet corresponding to the preceding RTS packet 510. Subfield Time Stamp in field CHA has the timestamp that indicates when the SNR was obtained. Upon receipt of CTS packet 520, the RA station will store this SNR in its SNR table.

Figure 6:
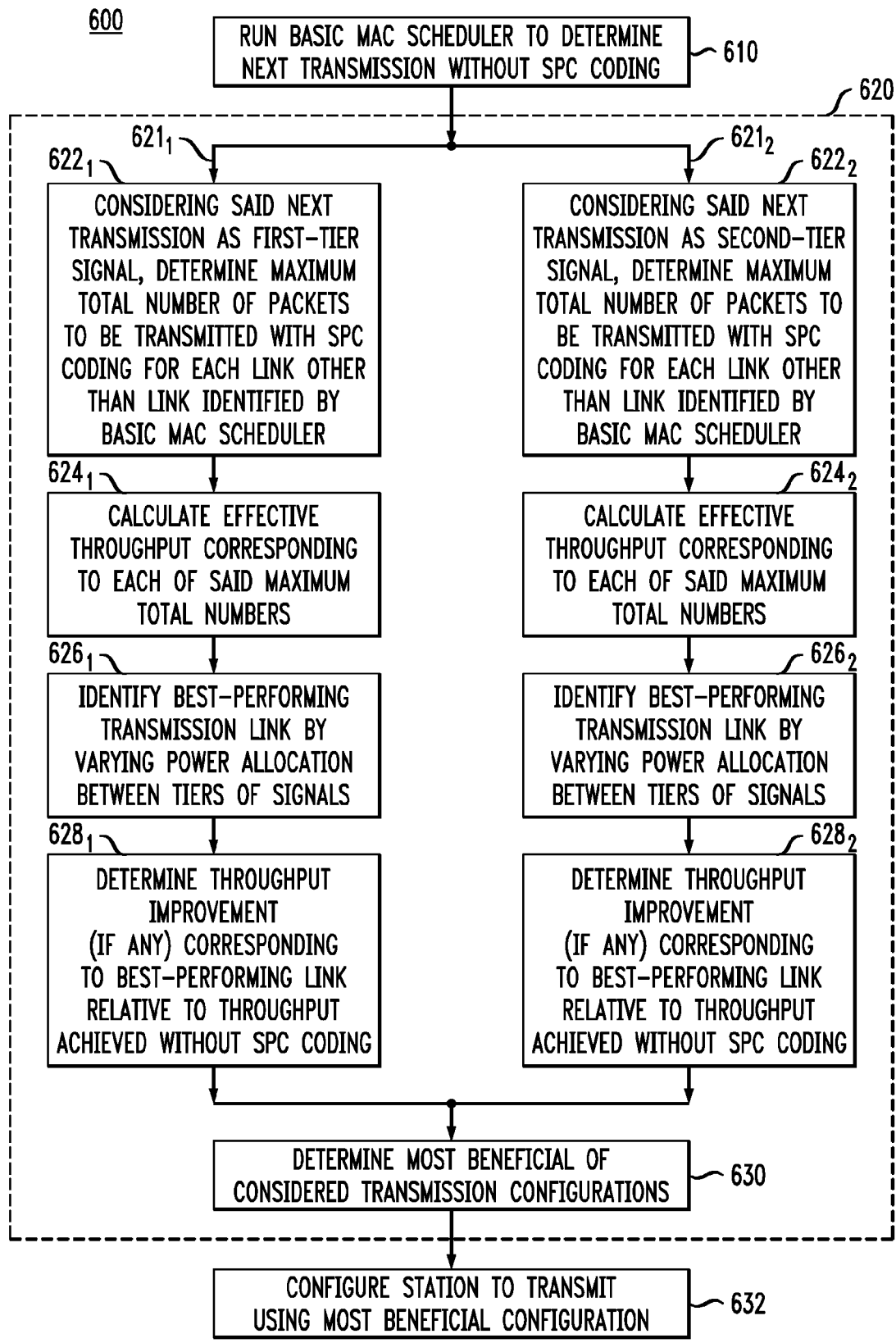
FIG. 6 shows a flowchart of a MAC scheduler that can be used at a station of the network of FIG. 1 according to one embodiment of the invention.

FIG. 6 shows a flowchart of a MAC scheduler 600 that can be used at a station of network 100 according to one embodiment of the invention. More specifically, MAC scheduler 600 can be used to schedule SPC-coded transmissions from a single transmitter to multiple receivers. MAC scheduler 600 is designed to provide an extension to a "basic" MAC scheduler that is suitable for use in network 100 when the network is configured to operate using conventional single-tier signals, without employing multi-tier signals. The basic MAC scheduler can be a prior-art MAC scheduler, such as one of FIFO (first-in-first-out), round-robin, and proportional-fairness schedulers, or any other (e.g., developed in the future) suitable MAC scheduler.

In processing block 610 of scheduler 600, the basic MAC scheduler is run to determine a next supposed transmission from the station. The results of the basic MAC scheduler are fed to processing block 620, which represents an add-on to the basic MAC scheduler. Processing block 620 serves the purpose of improving the data throughput for the station by utilizing multi-user wireless channels.

The following nomenclature is used in the description of processing block 620. The station is assumed to have n neighbor stations denoted by index i, where $1 \leq i \leq n$. $h_i$ denotes signal attenuation (also often referred to as channel gain) in the corresponding i-th link. $Q_i$ denotes the queue of packets awaiting transmission over the i-th link, with $|Q_i|$ being the total length of queue $Q_i$. Unless explicitly stated otherwise, it is assumed that the total power of each (SPC-coded or not) transmission is fixed at P; all packets have the same size (s); and there are two tiers of signals. $N_0$ denotes the background noise. $R^{(1)}(i,p)$ and $R^{(2)}(i,p)$ denote functions that return transmission rates for the first- and second-tier signals, respectively, of the i-th link, where p is a variable denoting the transmission power allocated to the corresponding signal. $t_j$ denotes the arrival time at the station of the j-th packet (the arrival time is expressed in terms of the number of packets that arrived before the j-th packet and, as such, is different from the timestamp in the CHA field of ACK, DATA and CTS). D is a parameter that denotes the maximum depth (time lag to the top of the queue) within which the station looks for packets to be transmitted with SPC coding. The packets that are outside that depth are not considered for SPC coding until they move up in the queue to be within depth D. If D is sufficiently large, then, for all practical purposes, the entire queue becomes eligible for SPC coding.

Suppose that the basic MAC scheduler of processing block 610 has determined that the next packet to be transmitted is $pkt_{i_1}$, with $i_1$ being the index identifying the corresponding transmission link and $t_1$ being the arrival time of packet $pkt_{i_1}$. The basic MAC scheduler provides this determination to processing block 620. Processing block 620 has two parallel branches $621_1$ and $621_2$ composed of generally analogous steps. Branch $621_1$ treats $pkt_{i_1}$ as a first-tier signal of the corresponding multi-tier signal and has processing steps designated with subscript "1". Similarly, branch $621_2$ treats $pkt_{i_1}$ as a second-tier signal and has processing steps designated with subscript "2". One skilled in the art will appreciate that, in a different embodiment of MAC scheduler 600, one or more additional parallel branches corresponding to one or more additional tiers of signals can similarly be included in processing block 620.

In step $622_1$, each queue $Q_i$, where $i \neq i_1$, is analyzed to determine the maximum total number ($N_i$) of packets that can be transmitted using SPC coding during the transmission of packet $pkt_{i_1}$. $N_i$ can be determined, e.g., using Eq. (1):

$$N_i = 1 + \min\left(\frac{R^{(2)}(i, P-p)}{R^{(1)}(i_1, p)}, |Q_i|_{(D)}\right) \quad (1)$$

In Eq. (1), the first term (i.e., the 1) counts packet $pkt_{i_1}$, which is going to be transmitted as a first-tier signal, and the second term (i.e., the min function) counts possible additional packets from queue $Q_i$, which are going to be transmitted as a second-tier signal, with $|Q_i|_{(D)}$ being the number of backlogged packets whose arrival time differs from $t_1$ by no more than D.

Functions $R^{(1)}$ and $R^{(2)}$ used in Eq. (1) return the respective rates using the known relationship between the rates specified in IEEE Standard 802.11, signal-to-interference-plus-noise ratio (SINR), and optionally the packet error rate (PER). In one implementation, functions $R^{(1)}$ and $R^{(2)}$ are expressed as follows:

$$R^{(1)}(i, p) = \log_2\left(1 + \frac{p|h_i|^2}{(P-p)|h_i|^2 + N_0}\right) \text{bits/sec/Hz} \quad (2a)$$

$$R^{(2)}(i, p) = \log_2\left(1 + \frac{p|h_i|^2}{N_0}\right) \text{bits/sec/Hz} \quad (2b)$$

In another implementation, Eqs. (2a)-(2b) are appropriately modified to take into account the effect of PER. Suitable numerical functions providing the relationship between the rate, SINR, and PER are tabulated, e.g., in K.-Y. Doo, J. Young Song, and D.-H. Cho, "Enhanced Transmission Mode Selection in IEEE 802.11a WLAN System," Proceedings of Vehicular Technology Conference, Los Angeles, September 2004, pp. 5059-5062, which is incorporated herein by reference in its entirety.

PER for the station is a selectable parameter that is specified in a corresponding configuration file. The configuration file might list different PER values for different tiers of signals. The SINR for the first-tier signal is calculated using Eq. (3a):

$$SINR^{(1)}(i, p) = \frac{p|h_i|^2}{(P-p)|h_i|^2 + N_0} \quad (3a)$$

The SINR for the second-tier signal is calculated using Eq. (3b):

$$SINR^{(2)}(i, p) = \frac{p|h_i|^2}{N_0} \quad (3b)$$

The respective PER and SINR values unequivocally determine the rate values returned by the PER-modified functions $R^{(1)}$ and $R^{(2)}$.

In step $624_1$, the respective effective data throughput ($T_i$) corresponding to each $N_i$ (see also Eq. (1)) is calculated using Eq. (4):

$$T_i = \frac{1}{s} N_i R^{(1)}(i, p) \quad (4)$$

Note that, in Eq. (4), the term $s/R^{(1)}(i,p)$ represents the transmission time of packet $pkt_{i1}$. Thus, $T_i$ is calculated by taking the total number of transmitted packets (i.e., $N_i$) and dividing it by the transmission time.

In step $626_1$, the best-performing link is identified. More specifically, first, a maximum possible value of each $T_i$ is determined by varying p. Then, the highest of these maximum possible throughput values (T*) is identified. The link corresponding to T* is the best-performing link and is hereafter denoted by index $i_2$. The value of p corresponding to T* is denoted as p*.

In step $628_1$, the possible data throughput that can be achieved with the corresponding SPC configuration (i.e., packet $pkt_{i1}$ being transmitted as a first-tier signal with power p* and the packets from queue $Q_{i2}$ being transmitted as a second-tier signal with power P-p*) is quantified and compared with the data throughput obtained in a situation when those same packets are transmitted without SPC coding. First, it is determined whether this SPC configuration would actually provide any throughput improvement at all. Eq. (5) provides an appropriate criterion for this determination:

$$1 + \min\left(\frac{R^{(2)}(i_2, P-p*)}{R^{(1)}(i_1, p*)}, |Q_{i2}|_{(D)}\right) > \quad (5)$$

$$1 + \min\left(\left(\frac{1}{R^{(1)}(i_1, p*)} - \frac{1}{R^{(1)}(i_1, P)}\right) R^{(2)}(i_2, P), |Q_{i2}|_{(D)}\right)$$

Eq. (5) can be understood as follows. Its left part is an expression for the total number of packets that can be transmitted using the SPC configuration (see also Eq. (1)). The right part of Eq. (5) is an expression for the total number of packets that can be transmitted without SPC coding during the same transmission time. In the right part, the first term counts packet $pkt_{i1}$, which can be transmitted using the full transmit power (P). The corresponding transmission time is $s/R^{(1)}(i_1,P)$. The time difference ($\Delta t$) for the transmission of packet $pkt_{i1}$ with and without SPC coding is given by Eq. (6):

$$\Delta t = \frac{s}{R^{(1)}(i_1, p*)} - \frac{s}{R^{(1)}(i_1, P)} \quad (6)$$

Without SPC coding, this time difference can be used to transmit packets from queue $Q_{i2}$ with the full transmit power. The corresponding transmission time per packet is $s/R^{(2)}(i_2, P)$. By calculating the ratio of the $\Delta t$ of Eq. (6) to this transmission time per packet, one finds the number of packets that can be transmitted during $\Delta t$. This ratio is the first argument of the min function in the right part of Eq. (5). The second argument of that min function is the queue-depth limit that was already explained above in reference to Eq. (1).

If the criterion given by Eq. (5) is satisfied, then the identified SPC configuration can increase the throughput compared to that achieved with conventional single-tier signal transmission. In step $628_1$, this increase is quantified by calculating the number ($\Delta N_1$) of additional packets, whose transmission is enabled by the use of SPC coding, e.g., using Eq. (7):

$$\Delta N_1 = \min\left(\frac{R^{(2)}(i_2, P-p*)}{R^{(1)}(i_1, p*)}, |Q_{i2}|_{(D)}\right) - \quad (7)$$

$$\min\left(\left(\frac{1}{R^{(1)}(i_1, p*)} - \frac{1}{R^{(1)}(i_1, P)}\right) R^{(2)}(i_2, P)|Q_{i2}|_{(D)}\right)$$

If the criterion given by Eq. (5) is not satisfied, then the use of SPC coding is not beneficial and, in step $628_1$, $\Delta N_1$ is assigned a value of zero.

Branch $621_2$ has steps $622_2$-$628_2$, the execution of which yields the number ($\Delta N_2$) of additional packets, whose transmission is enabled by the use of SPC coding, with packet $pkt_{i1}$ being a second-tier signal. More specifically, in step $622_2$, the maximum total number ($N_i$) of packets is determined using Eq. (8), which is obtained by appropriately modifying Eq. (1):

$$N_i = 1 + \min\left(\frac{R^{(1)}(i, p)}{R^{(2)}(i_1, P - p)}, |Q_i|_{(D)}\right) \quad (8)$$

In step 6242, each effective throughput $T_i$ for each respective $N_i$ (Eq. (8)) is calculated using Eq. (9):

$$T_i = \frac{1}{s} N_i R^{(2)}(i, P - p) \quad (9)$$

In step 626₂, the best-performing link is identified by optimizing and sorting the effective throughputs. Finally, in step 628₂, $\Delta N_2$ is calculated using Eq. (10):

$$\Delta N_2 = \min\left(\frac{R^{(1)}(i_2, p*)}{R^{(2)}(i_1, P - p*)}, |Q_{i2}|_{(D)}\right) - \\ \min\left(\left(\frac{1}{R^{(2)}(i_1, P - p*)} - \frac{1}{R^{(1)}(i_1, P)}\right) R^{(1)}(i_2, P), |Q_{i2}|_{(D)}\right) \quad (10)$$

If the calculated $\Delta N_2$ is not positive, then it is assigned a value of zero.

In step 630, the values of $\Delta N_1$ and $\Delta N_2$ are compared to each other and to zero to determine the most beneficial transmission configuration. More specifically, if $\Delta N_1$ and/or $\Delta N_2$ are greater than zero, then the most beneficial transmission configuration is the SPC configuration corresponding to the higher of the two values. On the other hand, if both $\Delta N_1$ and $\Delta N_2$ are zero, then the most beneficial transmission configuration is one without SPC coding.

In step 632, MAC scheduler 600 configures the station to transmit an outgoing signal using the most beneficial transmission configuration determined in processing block 620. For example, if the largest of $\Delta N_1$, $\Delta N_2$, and 0 is zero, then MAC scheduler 600 configures the station to transmit $pkt_{i1}$ at full transmit power and without SPC coding. If the largest value is $\Delta N_1$, then MAC scheduler 600 configures the station to transmit $pkt_{i1}$ as a first-tier-signal while also transmitting packets corresponding to the best-performing link determined in branch 621₁ as a second-tier signal. The power allocation between the first- and second-tier signals is p*/P−p*, and the transmission rates are $R^{(1)}(i_1,p*)$ and $R^{(2)}(i_2,P-p*)$, respectively. If the largest value is $\Delta N_2$, then MAC scheduler 600 configures the station to transmit $pkt_{i1}$ as a second-tier signal, while also transmitting packets corresponding to the best-performing link determined in branch 621₂ as a first-tier signal. The power allocation between the first- and second-tier signals is p*/P−p*, and the transmission rates are $R^{(1)}(i_2,p*)$ and $R^{(2)}(i_1,P-p*)$, respectively.

The following example further illustrates the processing of MAC scheduler 600. Suppose that there are only two links, i=1 and i=2. Suppose that the maximum individual rates achievable over those links are 9 and 36, respectively. In other words, $R^{(1)}(1,P)=9$ and $R^{(1)}(2,P)=36$. Suppose that the processing of steps 622₁-626₁ has determined that $R^{(1)}(1,p*)=6$ and $R^{(2)}(2,P-p*)=24$. Assuming a sufficient number of backlogged packets, the execution of step 628₁ produces $\Delta N_1=2$ [=24/6−(1/6−1/9)36]. Further assuming that the processing of branch 621₂ yields $\Delta N_2=0$, MAC scheduler 600 will configure the station to use SPC coding, with packets corresponding to the first and second links transmitted as first- and second-tier signals, respectively. The use of SPC coding will result in a throughput increase corresponding to the transmission of two additional packets from queue number two.

One skilled in the art will appreciate that, in one embodiment, processing block 620 can be modified to include an additional branch that is executed in parallel with branches 621₁ and 621₂ to evaluate possible benefits of available side information. This additional branch has processing steps that are generally analogous to processing steps 622-628. However, the processing of this additional branch uses modified SINR values because the subtraction of a known interference signal reduces the effective SINR in a known quantifiable manner. The modified MAC scheduler 600 will choose the best transmission configuration after considering those determined by the three processing branches and configure the station to use that configuration.

Figure 7:
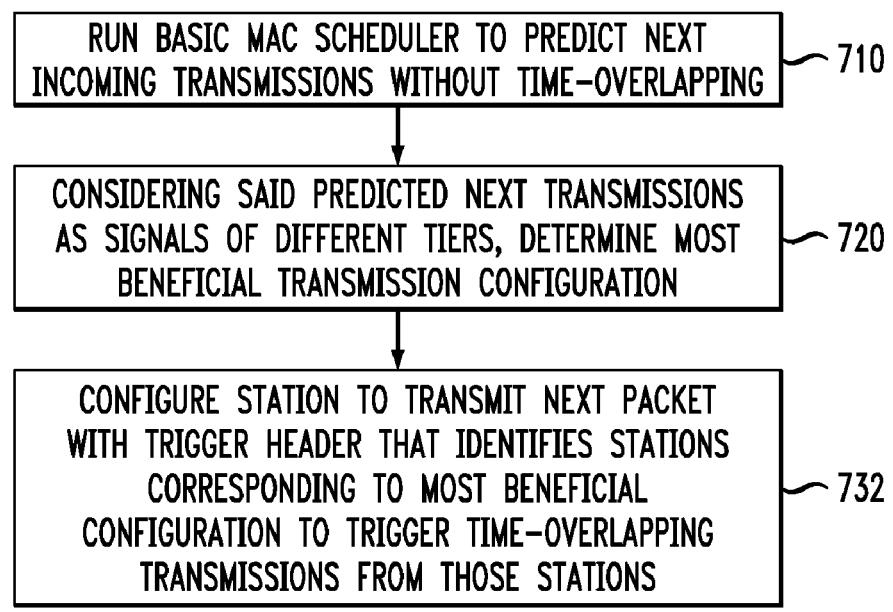
FIG. 7 shows a flowchart of a MAC scheduler that can be used at a station of the network of FIG. 1 according to another embodiment of the invention.

FIG. 7 shows processing blocks of a MAC scheduler 700 that can be used at a station of network 100 according to another embodiment of the invention. Similar to MAC scheduler 600, MAC scheduler 700 is designed as an extension to a basic MAC scheduler. MAC scheduler 700 can be used to schedule time-overlapping transmissions from multiple transmitters to a single receiver, the latter being the station running the scheduler.

At processing block 710, the basic MAC scheduler is run to predict next transmissions intended for the station. Processing block 710 is generally similar to processing block 610 (FIG. 6), except that, instead of using the knowledge of the contents of its queue buffers, the station uses the pending-traffic table. The results of the basic MAC scheduler are fed to processing block 720.

In one embodiment, MAC scheduler 700 is designed to constrain the total transmit power of time-overlapping transmissions to a specified value (P). In that case, processing block 620 of MAC scheduler 600 can be used substantially without modifications as processing block 720 of MAC scheduler 700. For example, in a two-transmitter case, the signal of the transmitter corresponding to the channel having the higher attenuation is treated as a first-tier signal, while the signal of the transmitter corresponding to the channel having the lower attenuation is treated as a second-tier signal.

In another embodiment, MAC scheduler 700 is designed not to constrain the total transmit power of time-overlapping transmissions. For example, each of the transmitting stations can be configured to use any transmit power up to the maximum individually achievable transmit power (P), with the sum of the individual transmit powers not being constrained to P. In that case, processing block 620 of MAC scheduler 600 can still be used as processing block 720 of MAC scheduler 700, but with some modifications. More specifically, instead of using Eqs. (3a)-(3b) for the corresponding SINR calculations in step 622, processing block 720 is configured to use Eqs. (11)-(12):

$$SINR^{(1)}(i, p) = \frac{p|h_i|^2}{p_j|h_j|^2 + N_0} \quad (11)$$

$$SINR^{(2)}(j, p) = \frac{p|h_j|^2}{N_0} \quad (12)$$

where i and j denote the links corresponding to the first- and second-tier signals, respectively. Eq. (12) is used to determine the minimum possible $p_j$ with which the j-th link can achieve transmission rate $R^{(1)}(j,P)$. The determined $p_j$ is plugged into Eq. (11), which is then used to determine the rate and power for the i-th link.

Depending on the results of processing block 720, MAC scheduler 700 may configure the station in step 732 to transmit an outgoing packet with a trigger field. This trigger field lists the stations corresponding to the most-beneficial transmission configuration identified in processing block 720. Upon receiving that packet and decoding the trigger field, the identified stations will proceed with their respective transmissions, each using the respective rate and power indicated in the trigger field. These transmissions will overlap to produce a corresponding multi-tier signal at the present station, which will apply packet realignment and SIC processing to decode that signal.

Different stations of network 100 might benefit from the use of MAC schedulers 600 and/or 700 to different extents because the realized throughput improvements depend on the actual network environment and traffic patterns. As a result, some stations might be able to gain an "unfair" advantage in terms of the effective medium access over some other stations. If medium-access fairness to different stations is a desired network property, then certain modifications of medium-access parameters might be in order.

In general, there are two main approaches to channel-access fairness: (1) equal access probability and (2) equal time-share access. Note that IEEE Standard 802.11 takes the equal access probability approach. It is known that equal access probability substantially results in equal long-term throughput for all competing stations. To maintain this property in the multi-user wireless-channel environment, the contention window used by the stations in network 100 can be modified as specified in Eq. (13):

$$CW' = CW \times \frac{R}{R'} \quad (13)$$

where CW' is the modified contention window; CW and R are the contention window and average data-transmission rate, respectively, for a station in network 100 when the latter is configured to operate without the use of SPC coding and/or time-overlapping transmissions; and R' is the average data-transmission rate for that station when the network is configured to use SPC coding and/or time-overlapping transmissions. It can be shown that shortening of the contention window in this manner results in substantially equal long-term data throughput for all competing stations, which spreads the benefits of the use of multi-user wireless channels evenly between different stations, regardless of the specific network environment and/or traffic patterns.

Figure 8:
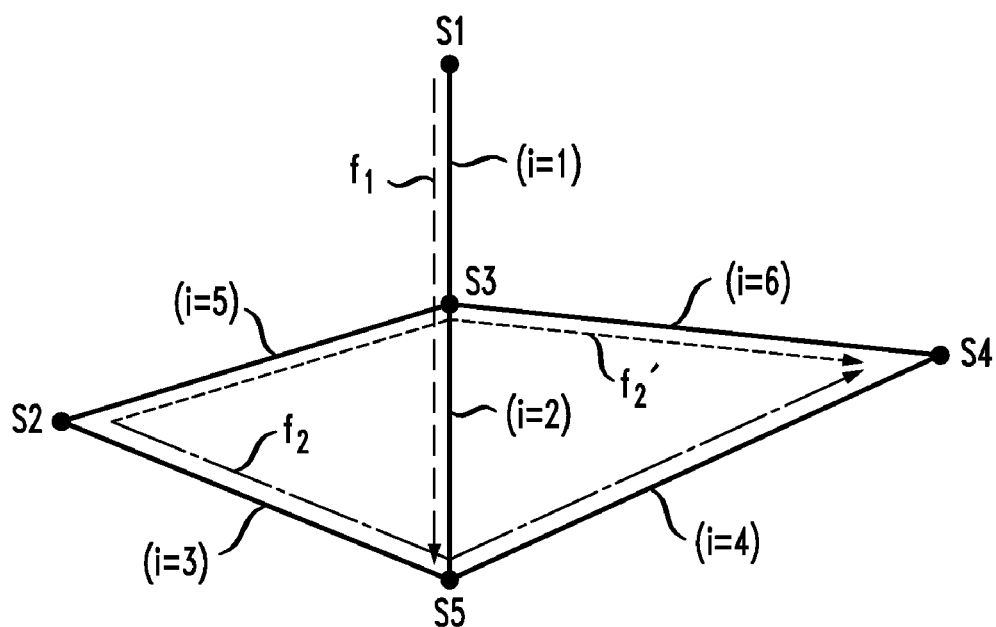
FIG. 8 shows a fragment of the network of FIG. 1, in which a routing protocol can be practiced according to one embodiment of the invention.

Routing Layer:

FIG. 8 shows a fragment 800 of network 100, in which a routing protocol can be practiced according to one embodiment of the invention. Fragment 800 has five stations S1-S5 interconnected by six wireless links labeled i=1, 2, . . . , 6. Note that FIG. 8 shows only some of the wireless links between stations S1-S5, i.e., those directly relevant to the discussion of the routing protocol below. For example, direct wireless links between stations (i) S1 and S2 and (ii) S1 and S4 are omitted.

The following example illustrates potential benefits of traffic-flow routing that actively seeks to utilize multi-user wireless channels. Suppose that a prior-art routing protocol has routed (i) traffic flow f1 from station S1 through station S3 to station S5, with station S3 acting as a relay, and (ii) traffic flow f2 from station S2 through station S5 to station S4, with station S5 acting as a relay. Further suppose that both traffic flows are backlogged to a relatively large degree.

With a conventional 802.11 MAC protocol, which provides equal medium access for all stations and schedules transmissions independently, both traffic flows f1 and f2 will substantially achieve equal data throughput. However, a routing protocol according to one embodiment of the invention can recognize that traffic flow f2 can be rerouted through station S3 (to become traffic flow f2', see FIG. 8), which station can then attempt to increase the overall data throughput by using multi-user wireless channels. More specifically, acting as a first-hop receiver, station S3 can trigger time-overlapping transmissions from stations S1 and S2, which can be decoded at station S3 using packet realignment and SIC processing. Then, acting as a second-hop transmitter, station S3 can use SPC coding to simultaneously transmit respective signals to stations S4 and S5. Assuming representative realistic SNR values for the various links in fragment 800, one can show that this rerouting of traffic flow f2 coupled with the use of multi-user wireless channels is capable of producing substantial (e.g., up to about 200%) throughput improvements for either traffic flow f1 or traffic flow 2, or both.

FIG. 9 shows a flowchart of a routing protocol 900 that can be used at a station of network 100 according to one embodiment of the invention. For clarity reasons and without loss of generality, certain aspects of routing protocol 900 are described below in reference to fragment 800 (FIG. 8). One skilled in the art will appreciate that routing protocol 900 can similarly be used to route traffic through network fragments having link topologies and/or traffic flows different from those shown in FIG. 8.

Routing protocol 900 is designed to manage local two-hop traffic flows by leveraging the use of multi-user wireless channels. In the context of routing protocol 900, a two-hop traffic flow is a traffic flow over two adjacent links, with at least one of the links having, as a terminal, a station that runs the protocol. For example, in fragment 800, each of traffic flows f1 and f2 is a two-hop traffic flow. For traffic flow f1, the first and second hops are links i=1 and i=2, respectively. For traffic flow f2, the first and second hops are links i=3 and i=4, respectively.

Routing protocol 900 can opportunistically take advantage of multi-user wireless channels by seeking and evaluating the following individual opportunities for their use and/or various combinations thereof: (i) the station serves as a first-hop receiver of an SPC-coded signal or a time-overlapping signal suitable for SIC processing; (ii) the station serves as a second-hop receiver of an SPC-coded signal or a time-overlapping signal suitable for SIC processing; and (iii) the station serves as a second-hop transmitter of an SPC-coded signal. Routing protocol 900 employs a set of constraints that ensures that rerouting of a traffic flow is performed only if such rerouting increases the effective individual data throughput for that traffic flow and does not decrease the effective individual data throughputs for other local traffic flows that might be affected by such rerouting. To avoid short-term routing fluctuations and the associated overhead, routing protocol 900 estimates potential throughput changes using SNR values that have been averaged over a relatively long period of time (e.g., about 30 seconds). Note that this feature of routing protocol 900 is different from the corresponding feature of each of MAC schedulers 600 and 700, in which most-recent SNR values are normally used.

Routing protocol 900 has processing blocks 910 and 930, with each station configured to run those processing blocks in parallel. If executed at a first station of network 100, processing block 910 results in a transmission of a solicitation message by that station. Receipt of that solicitation message by a second station of network 100 triggers therein the execution of certain steps of processing block 930. Depending on the circumstances, each station of network 100 can, from time to time, play a role of the first station or a role of the second station.

In step 912 of processing block 910, the station continuously monitors its transmissions corresponding to each traffic flow to determine whether those transmissions generate multi-tier signals, such as SPC-coded and/or time-overlapping signals. If the station identifies a traffic flow that is handled without the use of multi-tier signals, then, in step 914, the station compares the transmission rate corresponding to that traffic flow with a specified threshold value. If the transmission rate is not lower than the threshold value, then the execution of processing block 910 loops back to step 912. If the transmission rate is lower than the threshold value, then the execution of processing block 910 moves on to step 916.

In step 916, the station transmits a solicitation message, with the current transmission rate stamped in that message. In one configuration, the solicitation message is piggybacked on the next packet transmitted by the station, e.g., using a specified bit sequence to indicate the presence of the solicitation message at the end of the packet. Note that the solicitation message may generally be heard by several neighbor stations that are capable of decoding at least the header of the transmitted packet and that the intended receiver of the payload portion of the transmitted packet might not be the same station that acts on the solicitation message.

In step 918, the station receives a response to the solicitation message. Since multiple stations can hear the solicitation message, the station might receive multiple responses. A received response contains an offer to reroute that provides appropriate specifics (e.g., suggested route, rate(s), power allocation, etc.) of such rerouting. The offering station has derived said specifics by executing processing block 930 of its copy of routing protocol 900.

In step 920, the station analyzes the received response(s) to decide whether to reroute. For example, the station may be configured to compare different offers to identify the "best" offer, e.g., that corresponding to the largest data-throughput increase. The station may further compare the potential data-throughput increase with a specified threshold value and act on the offer only if the increase exceeds that threshold value. Other appropriate offer-selection criteria may similarly be employed. If the station decides to reroute the corresponding traffic flow, then it does so in step 922, after which the processing of block 910 returns back to step 912. If the station decides to decline all offers to reroute, then the processing returns from step 920 back to step 912.

In step 932 of processing block 930, the station continuously monitors respective fractions ($\tau_i$) of the channel time occupied by various traffic flows in its vicinity. In one embodiment, the monitoring is performed based on listening to transmissions from neighbor stations, those transmissions carrying data packets that are not necessarily intended for the station. The station processes at least the headers of these "overheard" packets to deduce the corresponding channel-time fractions, which are then stored in a corresponding table. Step 932 is preferably run in the background, and the execution of processing block 930 transitions to step 934 upon receipt of a solicitation message from a neighbor station.

In step 934 of processing block 930, the station evaluates potential benefits of rerouting the traffic flow identified in the received solicitation message to now go through this station. More specifically, the station uses a set of criteria to determine whether such rerouting can (i) increase the effective data throughput for the traffic flow being suggested for rerouting and (ii) decrease the effective data throughput for other traffic flows that are currently routed through the station. If the rerouting is deemed beneficial, then, in step 936, the station sends to the solicitor station a response containing an offer to reroute with suggested rate(s), power allocation, and other appropriate parameters that have been determined in step 934. After step 936, the processing returns back to step 932. If it is determined in step 934 that the rerouting is not beneficial, then the processing also returns to step 932.

The following is an example of the processing that might be performed in step 934 by station S3 of fragment 800 (FIG. 8) upon receipt of a solicitation message from station S2. Suppose that the present traffic-flow configuration has traffic flows f1 and f2, and station S3 executes step 934 to decide whether a new traffic-flow configuration having traffic flows f1 and f2' is going to be beneficial. The total data throughput ($T_o$) corresponding to the present traffic-flow configuration is given by Eq. (14):

$$T_o = R^{(1)}(1,P)\tau_1 + R^{(1)}(3,P)\tau_3 \qquad (14)$$

The first term in the right part of Eq. (14) takes into account the contribution of traffic flow f1 into the total data throughput. Traffic flow f1 occupies fraction $\tau_1$ of the channel time on link i=1 and is transmitted without SPC coding at full transmit power P. The first term assumes traffic-flow conservation for traffic flow f1 at station S3, meaning that the amount of incoming data equals the amount of outgoing data, or in mathematical terms $R^{(1)}(1,P)\tau_1 = R^{(1)}(2,P)\tau_2$. Similarly, the second term in the right part of Eq. (14) takes into account the contribution of traffic flow f2 into the total data throughput. Traffic flow f2 occupies fraction $\tau_3$ of the channel time on link i=3 and is also transmitted without SPC coding at full transmit power P. The second term assumes traffic-flow conservation for traffic flow f2 at station S5, or in mathematical terms $R^{(1)}(3,P)\tau_3 = R^{(1)}(4,P)\tau_4$.

The total data throughput ($T_n$) corresponding to the new traffic-flow configuration is given by Eq. (15), which is analogous to Eq. (14):

$$T_n = R^{(1)}(1,p_1)\tau_1' + R^{(2)}(5,p_5)\tau_1' \qquad (15)$$

where $p_1$ and $p_5$ denote transmit power allocated to traffic flows f1 and f2' on links i=1 and i=5, respectively; and $\tau_1'$ is the new channel-time fraction on link i=1. Traffic-flow conservation for the new traffic-flow configuration is expressed by Eqs. (16a)-(16b):

$$R^{(1)}(1,p_1)\tau_1' = R^{(2)}(2,p_2)\tau_2' \qquad (16a)$$

$$R^{(2)}(5,p_5)\tau_1' = R^{(2)}(6,P-p_2)\tau_2' \qquad (16b)$$

where $p_2$ denotes transmit power allocated to traffic flow f1 on link i=2; and $\tau_2'$ is the new channel-time fraction on that link.

Eqs. (17a)-(17b) provide constraints on the changes in respective individual data throughputs (as opposed to the total data throughput, which is a sum of the individual data throughputs) for the individual traffic flows:

$$R^{(1)}(1,p_1)\tau_1' \geq R^{(1)}(1,P)\tau_1 \qquad (17a)$$

$$R^{(2)}(5,p_5)\tau_1' \geq R^{(1)}(3,P)\tau_3 \qquad (17b)$$

Eq. (17a) specifies that the individual data throughput for traffic flow f1 is not allowed to decrease upon rerouting. Similarly, Eq. (17b) specifies that the individual data throughput for traffic flow f2 is not allowed to decrease either.

Eq. (18) provides an additional constraint that states that, upon rerouting, the combined channel-time fraction occupied by traffic flows f1 and f2 is not allowed to increase:

$$\sum_{i=1}^{4} \tau_i \geq \sum_{i=1}^{2} \tau'_i \quad (18)$$

This constraint is aimed at preventing a possible deleterious ripple effect that might be caused in the vicinity of fragment 800 by the rerouting.

Station S3 (FIG. 8) will look for the values of $p_1$, $p_2$, and $p_5$ that maximize total data throughput $T_n$ while also trying to satisfy the constraints given by Eqs. (16)-(18). This mathematical problem can be solved, e.g., by trying out various possible combinations of 802.11 rates that are available on links i=1 and i=2. For each such rate pair, the corresponding values of $p_1$ and $p_2$ can unequivocally be determined using the corresponding rate function and the local SNR table. For each pair of $p_1$ and $p_2$ so determined, a corresponding value of $p_5$ can be found, e.g., by solving Eqs. (15) and (16a) for $p_5$. Once the values of $p_1$, $p_2$, and $p_5$ have been determined, the validity of the rest of the constraints, e.g., Eqs. (16b)-(18), can be verified. A valid solution corresponding to a highest value of total data throughput $T_n$ can be specified in a rerouting offer that station S3 sends to station S2 in step 936.

While this invention has been described with reference to illustrative embodiments, this description is not intended to be construed in a limiting sense. Although embodiments of the invention have been described in reference to communication systems that comply with IEEE Standard 802.11, the invention can similarly be used in other suitable systems. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a wireless transceiver, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. At a first station of a wireless network, a communication method comprising:
    comparing data throughputs corresponding to at least two different transmission configurations for transmission of a first communication signal over a first wireless link having the first station as a terminal, at least one of said transmission configurations corresponding to transmission having the first communication signal as a tier of a multi-tier signal and another one of said transmission configurations corresponding to transmission of the first communication signal as a single-tier signal; and
    from a plurality of wireless links, each having the first station as a terminal and being other than the first wireless link, selecting a second wireless link for transmission of a second communication signal in a transmission configuration in which the first and second communication signals correspond to different tiers of the multi-tier signal, wherein:
        the step of selecting comprises determining data throughputs corresponding to different wireless links of said plurality and identifying the second wireless link as a link corresponding to a highest of the determined data throughputs;
        the step of comparing includes comparing said highest of the determined data throughputs and the data throughput corresponding to the single-tier transmission of the first communication signal; and
        the communication method further comprises selecting a transmission configuration for the transmission of the first communication signal based on said comparison.

2. The method of claim 1, further comprising generating the multi-tier signal using superposition coding, wherein the first station is a transmitter of the first and second communication signals.

3. The method of claim 1, wherein:
    the first station is a receiver of the first communication signal; and
    a second station of the wireless network transmits the first communication signal as (i) part of a superposition-coded signal producing the multi-tier signal at the first station or (ii) a single-tier signal.

4. The method of claim 3, wherein:
    the second station transmits the first communication signal as a single-tier signal; and
    the step of selecting comprises selecting a transmission configuration that has the first communication signal as a tier of the multi-tier signal, wherein the multi-tier signal received at the first station is produced due to superposition of the first communication signal and the second communication signal, wherein the second communication signal is transmitted by a third station of the wireless network.

5. The method of claim 3, further comprising decoding the multi-tier signal using successive-interference-cancellation processing.

6. The method of claim 1, wherein:
the multi-tier signal has M tiers, where M is an integer greater than one; and
the step of selecting the second wireless link comprises:
determining data throughputs corresponding to a plurality of multi-tier transmission configurations, each corresponding to transmission of the first communication signal in a different respective tier of the multi-tier signal.

7. The method of claim 1, wherein the step of comparing comprises comparing data throughputs corresponding to first, second, and third transmission configurations for transmission of the first communication signal over the first wireless link, wherein:
the first transmission configuration corresponds to transmission of the first communication signal as a first-tier signal of the multi-tier signal;
the second transmission configuration corresponds to transmission of the first communication signal as a second-tier signal of the multi-tier signal; and
the third transmission configuration corresponds to the single-tier transmission.

8. The method of claim 1, wherein the step of selecting said second wireless link comprises varying power allocation between tiers of signals to optimize the data throughput achieved with a corresponding multi-tier signal.

9. The method of claim 1, further comprising determining, based on side information available at the first station, at least one data throughput for said comparison, wherein:
the first station is a receiver of the second communication signal; and
the side information comprises data content of the second communication signal.

10. The method of claim 1, wherein the step of selecting the transmission configuration comprises selecting a transmission configuration having a highest data throughput.

11. The method of claim 1, further comprising identifying a next outgoing transmission for the transmission configuration corresponding to the single-tier transmission based on contents of a packet buffer.

12. The method of claim 1, wherein:
the first station is a receiver of the first communication signal; and
the method further comprises:
transmitting an outgoing packet having a trigger field that identifies one or more stations of the wireless network corresponding to said selected transmission configuration; and
receiving the first communication signal, wherein the first communication signal has resulted from a transmission by the identified one or more stations having the selected transmission configuration.

13. The method of claim 12, further comprising predicting a next incoming transmission based on contents of a pending-traffic table.

14. The method of claim 1, further comprising transmitting the first communication signal using the selected transmission configuration.

15. The method of claim 1, further comprising:
obtaining channel-estimation information corresponding to the first wireless link; and
determining data throughputs for said comparison based on said channel-estimation information.

16. The method of claim 15, further comprising maintaining a channel-estimation-information table having one or more entries corresponding to one or more respective wireless links, each having the first station as a terminal.

17. The method of claim 15, wherein said channel-estimation information comprises a signal-to-noise ratio.

18. The method of claim 15, wherein:
the step of obtaining comprises processing a start-frame-delimiter (SFD) portion of a physical-layer frame received over the first wireless link from a second station of the wireless network to derive the channel-estimation information; and
the method further comprises feeding at least some of the derived channel-estimation information back to the second station.

19. A station of a wireless network, said station being adapted to:
compare data throughputs corresponding to at least two different transmission configurations for transmission of a first communication signal over a first wireless link having the station as a terminal, at least one of said transmission configurations corresponding to transmission having the first communication signal as a tier of a multi-tier signal and another one of said transmission configurations corresponding to single-tier transmission of the first communication signal; and
from a plurality of wireless links, each having the first station as a terminal and being other than the first wireless link, select a second wireless link for transmission of a second communication signal in a transmission configuration in which the first and second communication signals correspond to different tiers of the multi-tier signal, wherein:
to select the second wireless link, said station is configured to determine data throughputs corresponding to different wireless links of said plurality and identify the second wireless link as a link corresponding to a highest of the determined data throughputs;
to compare the data throughputs, said station is configured to compare said highest of the determined data throughputs and the data throughput corresponding to the single-tier transmission of the first communication signal; and
said station is further adapted to select a transmission configuration for the transmission of the first communication signal based on said comparison.

20. At a first station of a wireless network, a communication method comprising the steps of:
comparing data throughputs corresponding to at least two different transmission configurations for transmission of a first communication signal over a first wireless link having the first station as a terminal, at least one of said transmission configurations corresponding to transmission having the first communication signal as a tier of a multi-tier signal and another one of said transmission configurations corresponding to transmission of the first communication signal as a single-tier signal; and
selecting a transmission configuration for the transmission of the first communication signal based on said comparison, wherein:
the first station is a receiver of the first communication signal;
a second station of the wireless network transmits the first communication signal as a single-tier signal; and
the step of selecting comprises selecting a transmission configuration that has the first communication signal as a tier of the multi-tier signal, wherein the multi-tier signal received at the first station is produced due to superposition of the first communication signal and a second communication signal transmitted by a third station of the wireless network.

21. At a first station of a wireless network, a communication method comprising the steps of:
- comparing data throughputs corresponding to at least two different transmission configurations for transmission of a first communication signal over a first wireless link having the first station as a terminal, at least one of said transmission configurations corresponding to transmission having the first communication signal as a tier of a multi-tier signal and another one of said transmission configurations corresponding to transmission of the first communication signal as a single-tier signal; and
- selecting a transmission configuration for the transmission of the first communication signal based on said comparison, wherein:
    - the multi-tier signal has M tiers, where M is an integer greater than one; and
    - the step of comparing comprises:
        - determining data throughputs corresponding to a plurality of multi-tier transmission configurations, each corresponding to transmission of the first communication signal in a different respective tier of the multi-tier signal; and
        - sorting the determined data throughputs based on their values.

22. At a first station of a wireless network, a communication method comprising the steps of:
- comparing data throughputs corresponding to at least two different transmission configurations for transmission of a first communication signal over a first wireless link having the first station as a terminal, at least one of said transmission configurations corresponding to transmission having the first communication signal as a tier of a multi-tier signal and another one of said transmission configurations corresponding to transmission of the first communication signal as a single-tier signal;
- selecting a transmission configuration for the transmission of the first communication signal based on said comparison;
- obtaining channel-estimation information corresponding to the first wireless link; and
- determining data throughputs for said comparison based on said channel-estimation information, wherein:
    - the step of obtaining comprises processing a start-frame-delimiter (SFD) portion of a physical-layer frame received over the first wireless link from a second station of the wireless network to derive the channel-estimation information; and
    - the method further comprises the step of feeding at least some of the derived channel-estimation information back to the second station.

* * * * *